(12) United States Patent
Jang et al.

(10) Patent No.: US 6,929,461 B2
(45) Date of Patent: Aug. 16, 2005

(54) APPARATUS FOR MAKING MULTI-LAYER OPTICAL DISCS

(75) Inventors: Chau-Shin Jang, Hsinchu (TW); Li-Te Kuo, Hsinchu (TW); Rong-Chang Ma, Hsinchu (TW); Jyh-Chyang Chen, Hsinchu (TW); Yu-Hsiu Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 434 days.

(21) Appl. No.: 10/141,815

(22) Filed: May 10, 2002

(65) Prior Publication Data

US 2003/0111757 A1 Jun. 19, 2003

(30) Foreign Application Priority Data

Dec. 14, 2001 (TW) ........................................ 90131007 A

(51) Int. Cl.[7] .............................................. B29D 11/00
(52) U.S. Cl. ........................ 425/403; 425/437; 425/810; 156/344; 156/584
(58) Field of Search ................................ 425/403, 437, 425/520, 810; 264/1.33, 106, 107; 29/239, 426.5; 156/182, 242, 344, 580, 584

(56) References Cited

U.S. PATENT DOCUMENTS 6,478,069 B1 * 11/2002 Fujisaku et al. ............. 156/584
2003/0116274 A1 * 6/2003 Kitano et al. ................ 156/344
2003/0231578 A1 * 12/2003 Hayashi et al. ............. 369/283

FOREIGN PATENT DOCUMENTS

| EP | 1 026 677 A2 | * | 8/2000 |
| JP | 62-181117 | * | 8/1987 |
| JP | 07-290527 | * | 11/1995 |
| JP | 10-208316 | * | 8/1998 |
| JP | 11-203736 | * | 7/1999 |

OTHER PUBLICATIONS

English abstract for JP 62–181117.*
English abstract for JP 07–290527.*
English abstract for JP 10–208316.*
English abstract for JP 11–203736.*

* cited by examiner

*Primary Examiner*—Donald Heckenberg
(74) *Attorney, Agent, or Firm*—Birch, Stewart, Kolasch & Birch, LLP

(57) ABSTRACT

A method and apparatus for making multiple layer optical discs is applied to separate the base plate from the mold plate. The apparatus includes a first adhesive ending groove, a mold plate, a sealing member and an air-blowing axle. The adhesive does not cover the area around the first and second openings and the first and second adhesive ending grooves, so an enclosed cavity is formed between the first and second openings. The air-blowing axle passes through the second opening and encloses the cavity but leaves injection ports in the cavity so that air can be injected into the cavity for separating the base plate and the mold plate while the second recording layer and the adhesive layer adhere to the base plate.

12 Claims, 8 Drawing Sheets

APPARATUS FOR MAKING MULTI-LAYER OPTICAL DISCS

BACKGROUND OF THE INVENTION

1. Field of the Invention

The invention generally relates to a method and apparatus for making a multiple layer optical discs, and more particularly relates to a method and apparatus for separating the base plate from a mold plate when fabricating an optical disc.

2. Related Art

Optical discs have recently become the most popular storage media for data or information. Recordable discs and pressed discs are two kinds of optical discs that can carry data. A recordable (or rewritable) disc is made first with a base plate of carbon fiber. A layer of organic dye is then applied on the base plate for forming a data-recordable layer that is formed by a photochemical reaction. A beam-reflection layer and a protection layer are further applied on the disc to create a finished product ready for recording. The pressed discs are applied for mass production of data-ready discs. The original data are transformed into a laser signal beam for forming a master through opto-machining and plating processes. A stamp is made from the master for fabricating disc products. A recording layer and an adhesive layer are applied on the stamp, which are pressed and adhered to a base plate. Then, the base plate with recording layer carrying data patterns is separated from the stamp. Finally, a protection layer is applied on the data surface to finish the optical disc.

Prior methods for separating the base plate 10 from the mold plate 30 are based on different diameters of the two. As shown in FIG. 1, the outer diameter of the base plate 10 can be larger than that of the mold plate 30 so that the force from the forcing member 60 can be applied at the outer rim of the base plate 10. In this manner, excessive adhesive gathers on the rim of the base plate 10, as shown in FIG. 3, which makes separation difficult. The excessive adhesive also makes the recording layer uneven and loose from the base plate 10, which causes false reading of data. If, as shown in FIG. 2, the inner diameter of the base plate 10 is smaller than that of the mold plate 30, no excessive adhesive gathers on the rim, but the separating force from the forcing member 60 applied on the center of the base plate 10 easily deforms the base plate 10 and makes the disc unusable. Table 1 lists deformation characteristics of optical discs made with the inner pressing method of prior arts.

Therefore, a new method is needed that will solve the aforesaid problems of excessive adhesive and deformation when separating the base plate from the mold plate.

SUMMARY OF THE INVENTION

The object of the invention is therefore to provide a method and apparatus for making a multiple layer optical disc. It utilizes air injected into an enclosed cavity formed between the base plate and the mold plate so as to separate the two smoothly.

An apparatus for making multiple layer optical discs according to the invention is applied to separate the base plate from the mold plate. The base plate is formed with a first opening, an empty zone and a data zone. A first recording layer is formed in the data zone. The apparatus includes a first adhesive ending groove, a mold plate, a sealing member and an air-blowing axle. The first adhesive-ending groove is formed on the empty zone of the base plate. The mold plate, movably pressed on the base plate, includes a main body, a second opening, a second adhesive ending groove, a second recording layer and an adhesive layer. The second opening is located on the main body at a position corresponding to the first opening of the base plate. The second adhesive-ending groove is located on the main body at a position corresponding to the first adhesive-ending groove of the base plate. The second recording layer formed on the main body adheres with the first recording layer of the base plate by the adhesive layer. The adhesive doesn't cover the area around the first and second openings and the first and second adhesive ending grooves, so an enclosed cavity is formed between the first and second openings. The sealing member is mounted on the outer portion of the first opening. The air-blowing axle passes through the second opening and encloses the cavity but leaves injection ports in the cavity so that air can be injected into the cavity for separating the base plate and the mold plate while the second recording layer and the adhesive layer adhere to the base plate.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

The invention provides a method and apparatus for making optical discs in which air is injected into an enclosed cavity formed between the base plate and the mold plate. The air pressure separates the mold plate smoothly from a second recording layer where the least adherence exists.

Figure 4A:
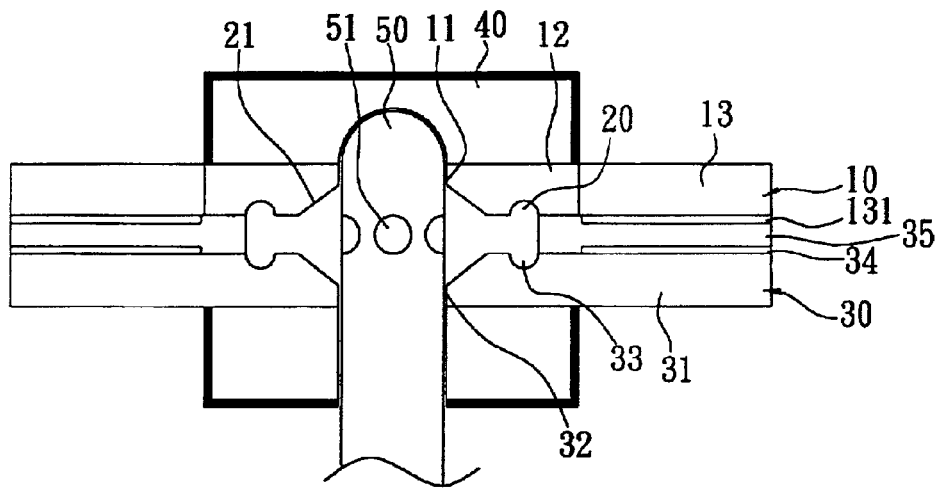
FIGS. 4A, 4B and 4C are sequential sectional views showing the construction and function of the separating apparatus of the invention.
Figure 5:
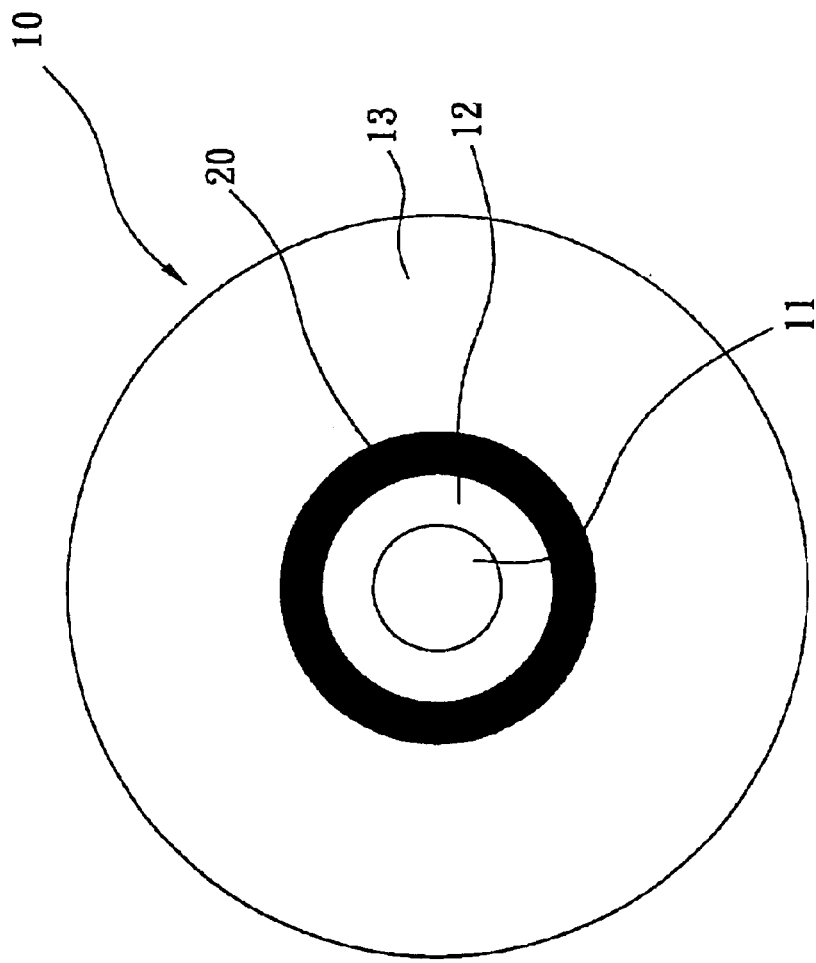
FIG. 5 is a top view of a first embodiment of a base plate in the invention.

As shown in FIGS. 4A and 5, an apparatus makes a multiple layer optical disc from a base plate 10. The base plate 10 includes a first opening 11, an empty zone 12 and a data zone 13. The data zone 13 carries a first recording layer 131. The apparatus includes a first adhesive-ending groove 20, a fillet 21, a mold plate 30, a sealing member 40 and an air-blowing axle 50.

The first adhesive-ending groove 20 is located in the empty zone 12 and formed with a circle concentric with the first opening 11. The fillet 21 is formed between the first opening 11 and the first adhesive-ending groove 20. The mold plate 30 is movably pressed on the base plate 10. The mold plate 30 includes a main body 31, a second opening 32, a second adhesive-ending groove 33, a second recording layer 34 and an adhesive layer 35. The second opening 32 is located on the main body 31 at a position corresponding to the first opening 11 of the base plate 10. The second adhesive-ending groove 33 is located on the main body 31 at a position corresponding to the first adhesive-ending groove 20 of the base plate 10 and formed with a circle concentric with the second opening 32. The second recording layer 34 formed on the main body 31 adheres with the first recording layer 131 of the base plate 10 by the adhesive layer 35. The adhesive 35 does not cover the area around the first and second openings 11 and 32 and the first and second adhesive ending grooves 20 and 33, so an enclosed cavity is formed between the first and second openings 11 and 32.

The sealing member 40 is mounted on the outer portion of the first opening 11 and/or the second opening 32. The air-blowing axle 50 passes through the second opening 32 and encloses the cavity but leaves several injection ports 51 in the cavity formed between the base plate 10 and the mold plate 30. And one of the injection ports 51 corresponding to other one of the injection ports 51 to let the stress come from the air uniformly.

Figure 2:
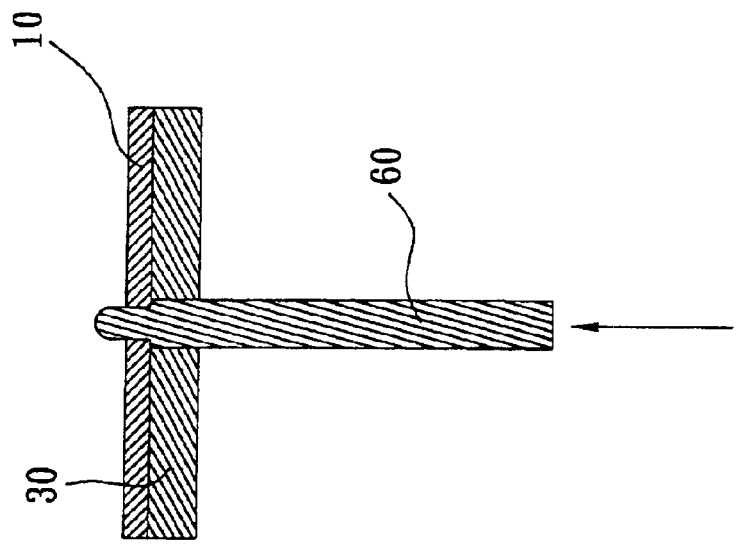
FIGS. 1, 2 are explanatory views showing separating methods for base and mold plates of prior arts.
Figure 1:
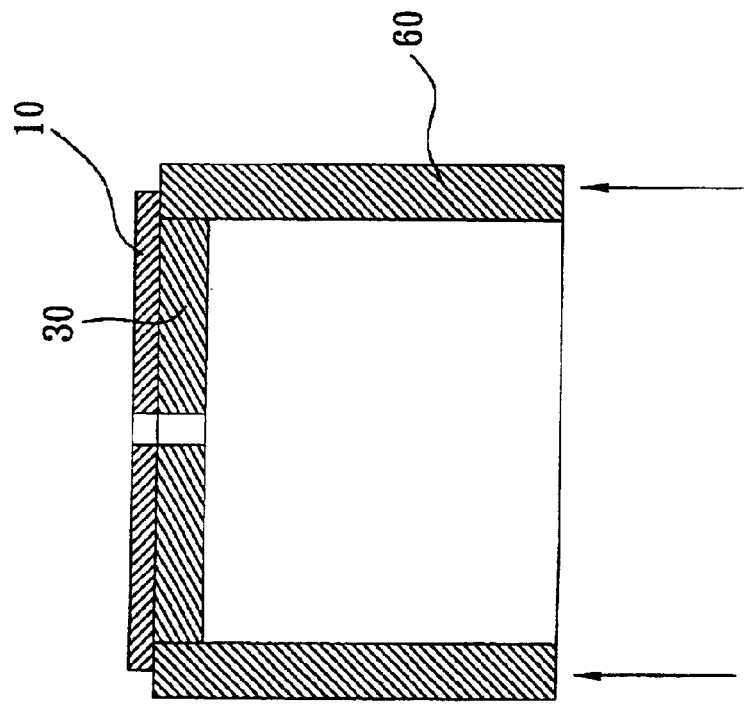
Figure 6:
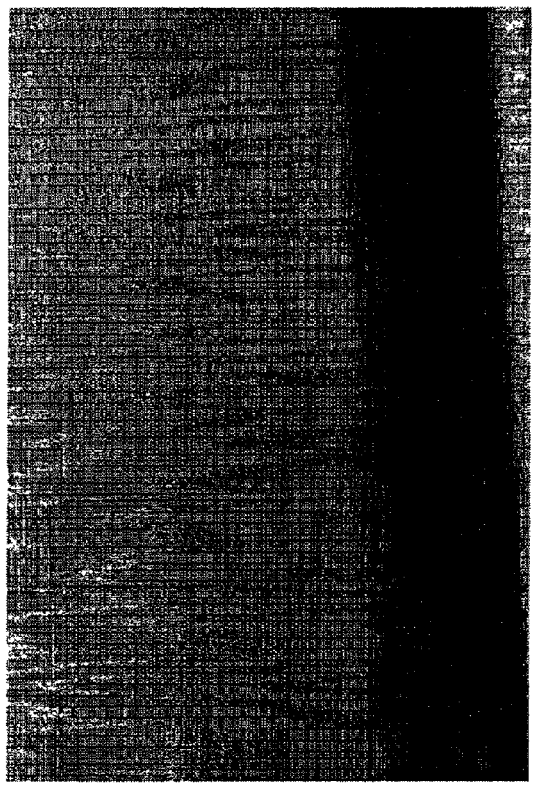
FIG. 6 is a photo showing no excessive adhesive formed on rim of an optical disc made by the invention.
Figure 3:
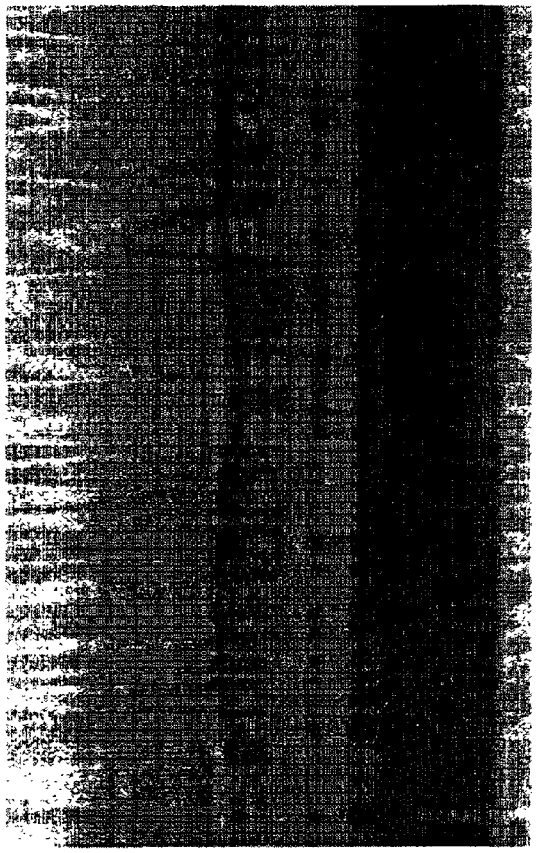
FIG. 3 is a photo showing excessive adhesive formed on the rim of a prior optical disc.
Figure 4B:
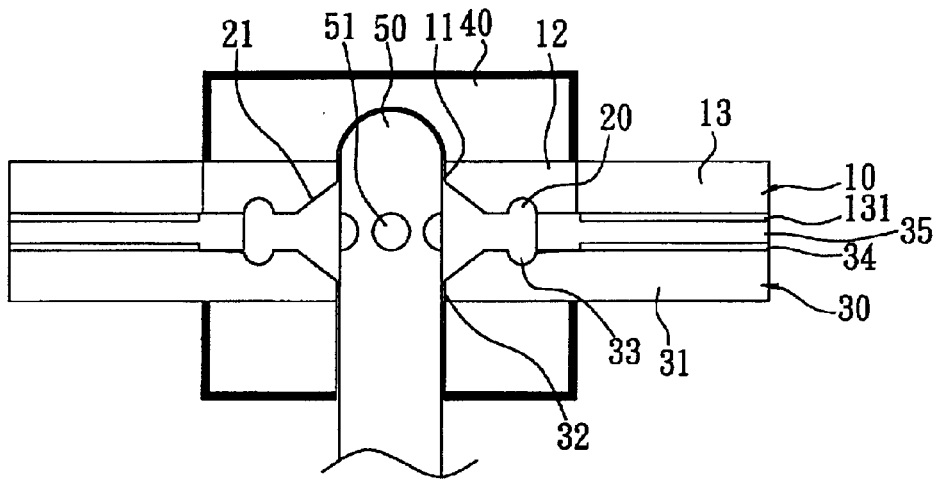
Figure 4C:
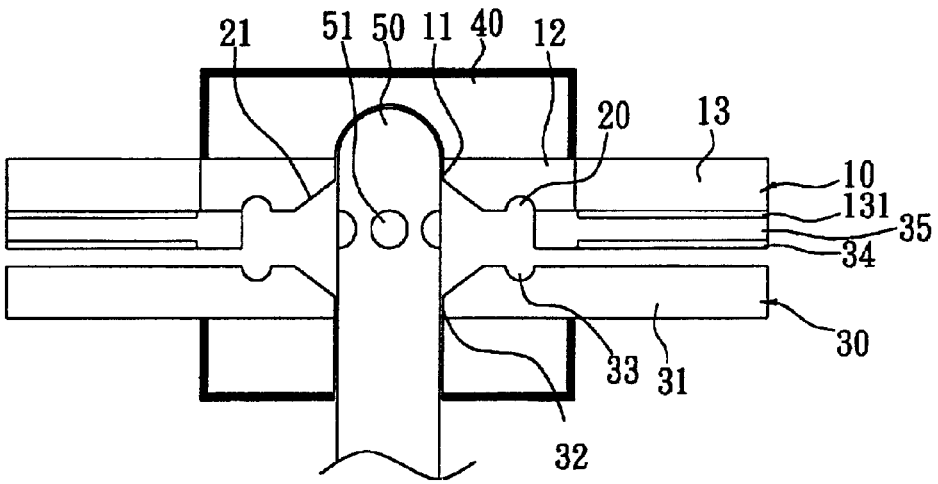

As shown in FIGS. 4A, 4B and 4C, air is injected into the cavity. Since the adherence between the second recording layer 34 and the main body 31 is less than the adherence among the first recording layer 131, the adhesive 35 and the second recording layer 34, the air pressure forces the recording layer 34 to separate from the main body 31. The fillet 21 helps the air flow smoothly. Therefore, the base plate 10 and the mold plate 30 can be smoothly separated, and the second recording layer 34 and the adhesive layer 35 adhere to the base plate 10. The diameters of the base plate 10 and the mold plate 30 in the invention are kept the same so as to prevent excessive adhesive from forming on the rim of the base plate 10, as shown in FIG. 6. The air evenly forcing the base plate 10 and the mold plate 30 apart also prevents the base plate 10 from deformation. As shown in Table 2, the deformation measurement values for optical discs of the invention are less than that of prior arts listed in Table 1.

Figure 7:
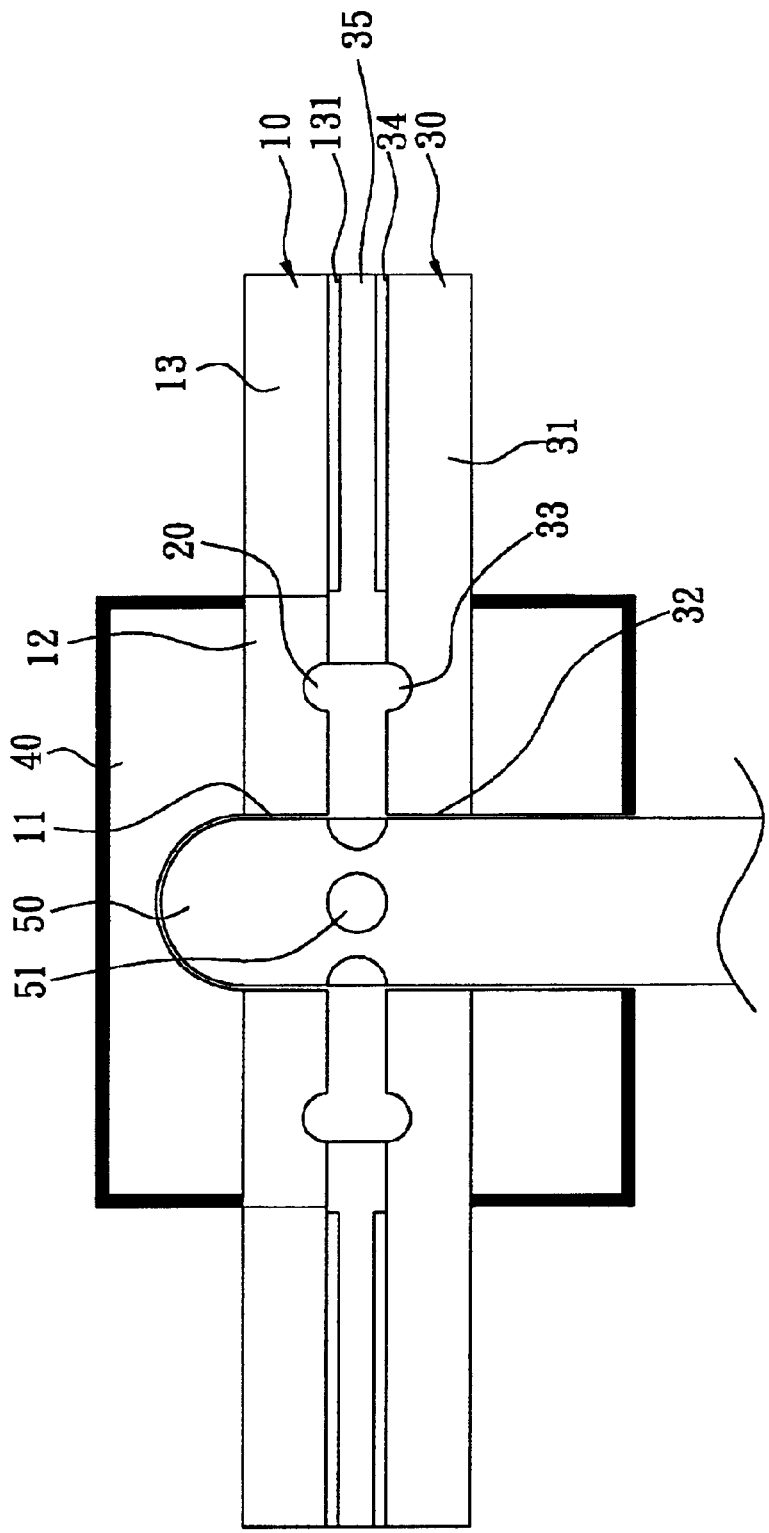
FIG. 7 is a sectional view of another construction of the invention.

In FIG. 7, there is no fillet 21 but the air functions the same to separate the base plate 10 and the mold plate 30.

Figure 8:
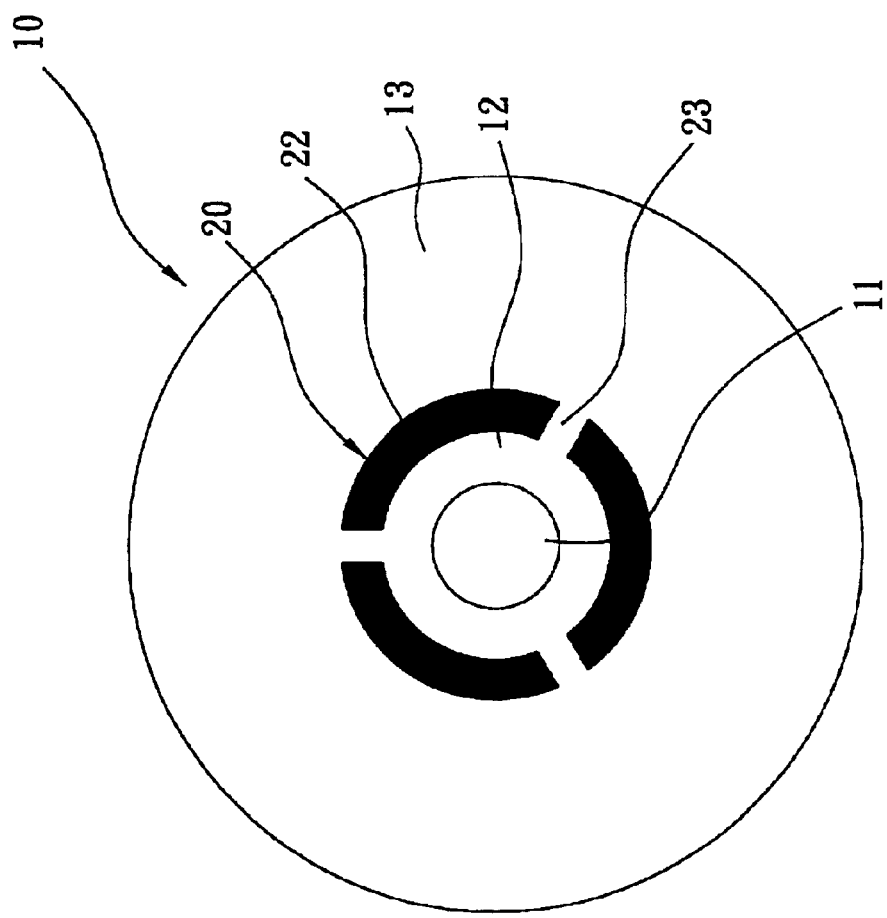
FIG. 8 is a top view of a second embodiment of a base plate in the invention.

In FIG. 8, the aforesaid first and second adhesive-ending grooves are replaced with arc portions 22 and partial spaces 23 so that the first and second adhesive-ending grooves 20 and 33 are broken circles that can prevent adherence between the base plate 10 and the mold plate 30, so they can be more easily separated.

Figure 9:
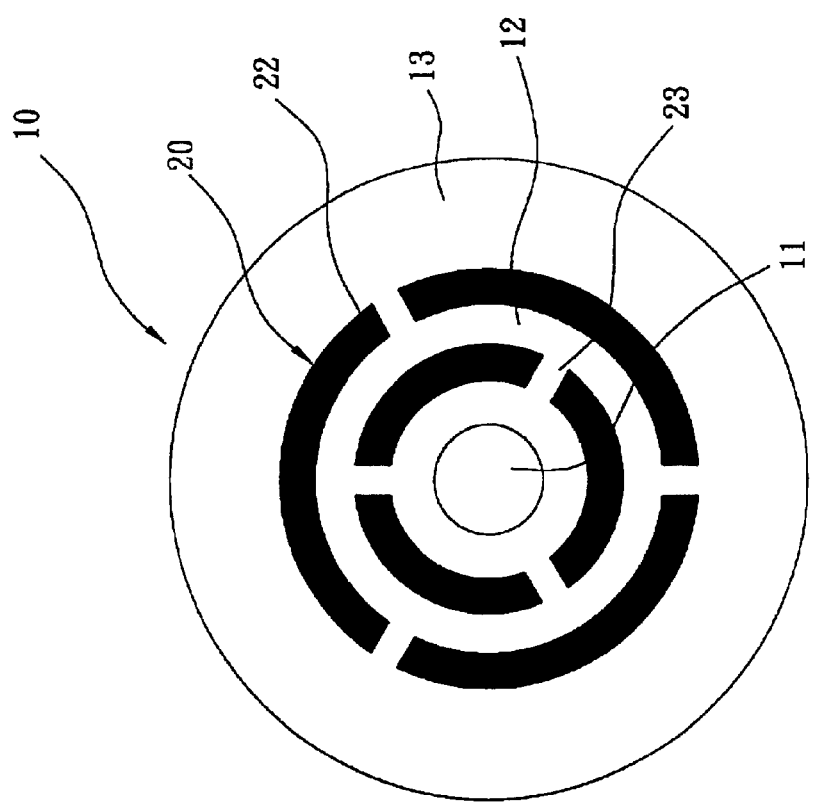
FIG. 9 is a top view of a third embodiment of a base plate in the invention.

In FIG. 9, the first and second adhesive-ending grooves are replaced with two circles of arc portions 22 and partial spaces 23. The partial spaces 23 in the inner and outer circles are not aligned with each other. Thus, most of the excessive adhesive is stopped in the outer grooves and does not pass to the inner grooves. The broken two-layer first and second adhesive-ending grooves 20 and 33 prevent adherence between the base plate 10 and the mold plate 30 so they can be more easily separated.

In the aforesaid embodiments, the separating process is performed only when the base plate 10 and the mold plate 30 have been well pressed and adhered. This is controlled by timer or monitoring of the air pressure change.

Figure 10:
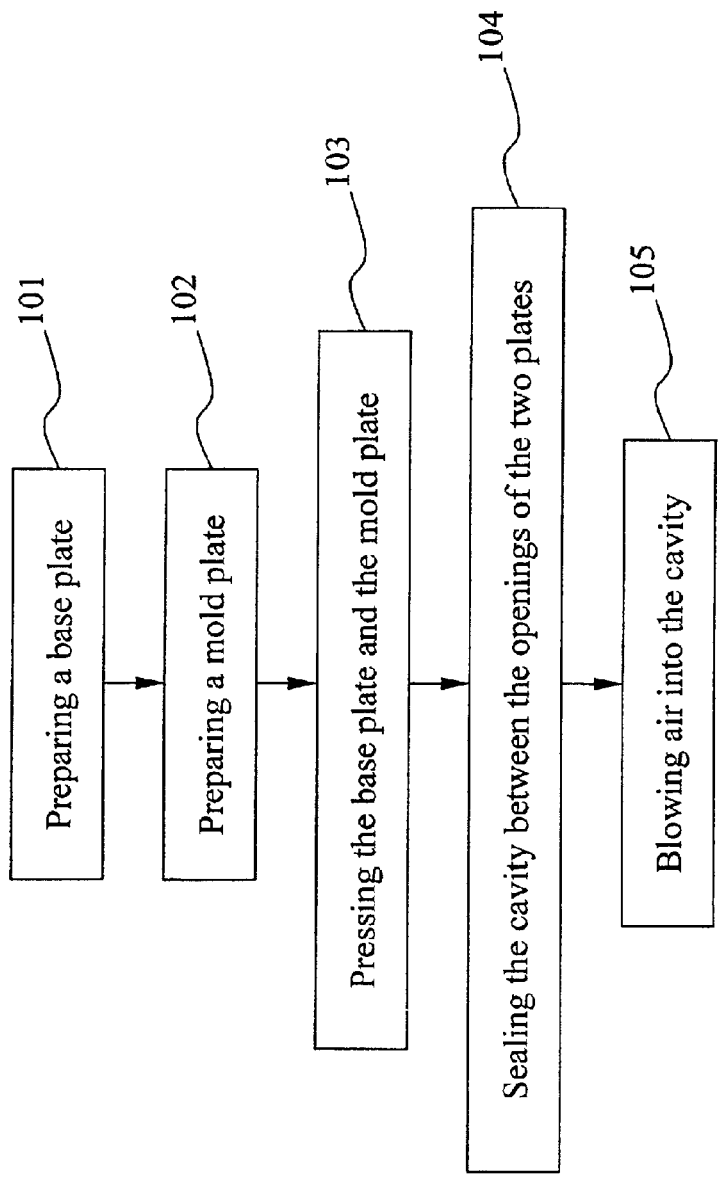
FIG. 10 is a flowchart of a method for separating base and mold plates according to the invention.

FIG. 10 is a flowchart showing a method for making multiple layer optical discs according to the invention. First, in step 101, a base plate with an empty zone and data zone is prepared. The empty zone includes a first opening and a first adhesive-ending groove. The data zone is formed with a first recording layer. In step 102, a mold plate is prepared. The mold plate includes a main body, a second opening, a second recording layer, a second adhesive-ending groove and an adhesive layer. The second opening is located on the main body at a position corresponding to the first opening of the base plate. The second adhesive-ending groove is located on the main body at a position corresponding to the first adhesive-ending groove of the base plate. The adhesive layer does not cover the area of the second adhesive-ending groove and the second opening. In step 103, the base plate and the mold plate are pressed to make the second recording layer adhere with the first recording layer by the adhesive layer. In step 104, the cavity between the first opening and the second opening is sealed so as to prevent air from escaping from itself that enclosed by the first and second adhesive-ending grooves. In step 105, air is blown into the cavity so as to separate the second recording layer from the main body while the second recording layer has been adhered to the base plate.

As described above, the invention provides a method and apparatus for making multiple layer optical discs. The invention has at least the following advantages:
a) It utilizes air blown into a cavity formed between the base plate and the mold plate for separating them smoothly. It does not cause deformation to the base plate;
b) A suitable enclosed cavity and airflow path is provided for fast separation;
c) The same diameter is applied to both the base plate and the mold plate, which that prevents the problem of excessive adhesive accumulation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for making multiple layer optical discs, comprising:

a base plate, formed with a first recording layer;

a mold plate, movably pressed on said base plate, comprises a main body, a second opening, a second recording layer and an adhesive layer, said second opening located on said main body forms a cavity with said base plate, said second recording layer formed on said main body adhere with said first recording layer of said base plate by said adhesive layer, said adhesive does not cover the area around said second opening; and an air-blowing axle, passing through said second opening and enclosing said cavity to inject air into said cavity for separating said base plate and said mold plate while said second recording layer and said adhesive layer adhere to said base plate; and a sealing member mounted on outer portion of said second opening so as to enclose said cavity.

2. An apparatus for making multiple layer optical discs according claim 1 wherein, said base plate comprises: a first opening, corresponding to said second opening and sealed by said sealing member so as to form said cavity; an empty zone, adjacent to said first opening and formed with a first adhesive-ending groove; and a data zone, adjacent to said empty zone and formed with said first recording layer.

3. An apparatus for making multiple layer optical discs according claim 2 wherein said mold plate comprises a second adhesive-ending groove formed on said main body at a position corresponding to said first adhesive-ending groove of said base plate.

4. An apparatus for making multiple layer optical discs according claim 3 further comprises a fillet formed between said second adhesive-ending groove and said second opening for guiding airflow in said cavity.

5. An apparatus for making multiple layer optical discs according claim 3 wherein said second adhesive-ending groove is circular and concentric with said second opening.

6. An apparatus for making multiple layer optical discs according claim 5 wherein said second adhesive-ending groove is formed with a plurality of arc portions and partial spaces so as to be broken circles.

7. An apparatus for making multiple layer optical discs according claim 6 wherein said second adhesive-ending groove is formed with at least two circles of arc portions and partial spaces, and said partial spaces in adjacent circles are not aligned with each other.

8. An apparatus for making multiple layer optical discs according claim 2 wherein said first adhesive-ending groove is circular and concentric with said first opening.

9. An apparatus for making multiple layer optical discs according claim 8 wherein said first adhesive-ending groove is formed with a plurality of arc portions and partial spaces so as to be broken circles.

10. An apparatus for making multiple layer optical discs according claim 9 wherein said first adhesive-ending groove is formed with at least two circles of arc portions and partial spaces, and said partial spaces in adjacent circles are not aligned with each other.

11. An apparatus for making multiple layer optical discs according claim 2 further comprises a fillet formed between said first adhesive-ending groove and said first opening for guiding airflow in said cavity.

12. An apparatus for making multiple layer optical discs according claim 1 wherein said air-blowing axle is formed with a plurality of injection ports located in said cavity, and one of the injection ports corresponding to another one of the injection ports.

* * * * *